(12) United States Patent
Gupta et al.

(10) Patent No.: US 10,114,920 B1
(45) Date of Patent: Oct. 30, 2018

(54) METHOD AND APPARATUS FOR PERFORMING SIGN-OFF TIMING ANALYSIS OF CIRCUIT DESIGNS USING INTER-POWER DOMAIN LOGIC

(71) Applicant: CADENCE DESIGN SYSTEMS, INC., San Jose, CA (US)

(72) Inventors: Umesh Gupta, Noida (IN); Shashank Tripathi, Ghaziabad (IN); Naresh Kumar, Greater Noida (IN); Arvind Nembili Veeravalli, Bangalore (IN); Prashant Sethia, Noida (IN); Ritika Govila, Gurgaon (IN)

(73) Assignee: Cadence Design Systems, Inc., San Jose, CA (US)

( * ) Notice: Subject to any disclaimer, the term of this patent is extended or adjusted under 35 U.S.C. 154(b) by 171 days.

(21) Appl. No.: 15/197,142

(22) Filed: Jun. 29, 2016

(51) Int. Cl.
*G06F 17/50* (2006.01)

(52) U.S. Cl.
CPC ............... *G06F 17/5081* (2013.01)

(58) Field of Classification Search
CPC ............ G06F 17/5081; G06F 17/5031; G06F 2217/84; G06F 17/504; G06F 17/509; G06F 2217/78
See application file for complete search history.

(56) References Cited

U.S. PATENT DOCUMENTS

| | | | |
|---|---|---|---|
| 2010/0164286 A1* | 7/2010 | Okano | G06F 1/3203 307/43 |
| 2010/0281444 A1* | 11/2010 | Zejda | G06F 17/5031 716/113 |

* cited by examiner

*Primary Examiner* — Vuthe Siek
(74) *Attorney, Agent, or Firm* — Rosenberg, Klein & Lee

(57) ABSTRACT

A netlist of a multiple voltage circuit design having a plurality of power domains is established, then inter-power domain (IPD) paths traversing the circuit design are identified, according to whether they traverse multi-supply elements, or are clock paths capturing such a path. The netlist is then pruned to disable or remove cells or stages not traversed by an IPD path. A timing analyzer conducts a multi-domain timing analysis of the IPD timing paths in the pruned IPD netlist. Thereby, the circuit design is thoroughly tested according to the applicable ranges of voltage conditions without excessive runtime.

20 Claims, 8 Drawing Sheets

METHOD AND APPARATUS FOR PERFORMING SIGN-OFF TIMING ANALYSIS OF CIRCUIT DESIGNS USING INTER-POWER DOMAIN LOGIC

BACKGROUND OF THE INVENTION

The subject system and method are generally directed to an efficient timing analysis of a multiple-voltage circuit design.

Signals do not move instantly through a circuit, but experience delay as they travel through the components and interconnections. If two signals, such as a data signal and a corresponding clock signal, arrive at the same circuit component too far out of sync with each other, they will interact in unexpected ways and the component will not operate as intended, causing a timing violation. Timing analysis is therefore commonly employed during a design phase of the circuit, as part of a sign-off process, to confirm that the signals will be properly synchronized under the various conditions that the circuit can be expected to experience.

One of the conditions that can affect the speed of a signal is the supply voltage for the components. If a range of supply voltages are applicable to certain components, these components should be tested to determine the timing under at least both the maximum and minimum of this range.

These tests are complicated by multiple-voltage circuit designs. When different components in the circuit require different voltage sources and/or supply voltage ranges, differing voltage domains, or power domains, are created, and it will be necessary to re-analyze the circuit for each combination of voltages. These combinations grow exponentially in number in relation to the number of domains, such that even a small number of voltage domains can dramatically increase the duration of the required testing.

One existing response to this issue involves reducing the number of combinations tested, based on likelihood that a timing violation will be detected in each. However, a likelihood is not a guarantee, and timing violations may remain undetected under this approach. There is therefore a need to efficiently reduce voltage-based testing required for timing analysis of a multiple-voltage design, while still testing all supply voltage combinations which could create a timing violation.

Another existing response involves testing under the maximum and minimum of a single broader range encompassing all ranges in the design. This approach frequently results in detection of "false positive" violations, as individual components are tested under supply voltages they will not experience in reality, and under timing constraints and other requirements that are likewise inapplicable. There is therefore a need to efficiently reduce voltage-based testing required for timing analysis of a multiple-voltage design, without testing under inapplicable conditions.

SUMMARY OF THE INVENTION

It is an object of the disclosed system and method to reduce runtime and memory use for voltage-based testing required for timing analysis of a multiple-voltage circuit design.

It is another object of the disclosed system and method to achieve this reduction while still confirming an absence of timing violations in all paths of the design under all applicable supply voltage conditions.

It is yet another object of the disclosed system and method to achieve this reduction without testing under excessively broad conditions that will result in unnecessary false detections of timing violations.

These and other objects may be attained in a method and apparatus for performing sign-off timing analysis of circuit designs using inter-power domain logic. While not limited thereto, a disclosed embodiment is directed to a method for multi-domain timing analysis of a circuit design having a plurality of interconnected cells and a plurality of power domains therefor. The power domains establish respective non-ground voltages provided by different power supplies.

In certain embodiments, the method may include establishing a netlist defining the cells of the circuit design. A plurality of timing paths may each be defined to traverse at least one of the cells of the circuit design.

In certain embodiments, the method may include executing a processor to selectively determine at least one of the timing paths to be an inter-power domain (IPD) timing path according to predetermined IPD criteria. The IPD criteria may include traversal by a timing path through at least one multi-supply element. Each multi-supply element may include one or more cells energized by multiple power domains.

In certain embodiments, the method may executing a processor to selectively actuate at least one multi-domain timing analysis based on each said IPD timing path.

While not limited thereto, another disclosed embodiment is directed to a method for multi-domain timing analysis of a circuit design having a plurality of interconnected cells and a plurality of power domains therefor. The power domains may establish respective non-ground voltages provided by different power supplies. The circuit design may have at least one multi-supply element. Each multi-supply element may include one or more cells energized by multiple power domains.

In certain embodiments, the method may include establishing a netlist defining the cells of the circuit design. A plurality of timing paths may each be defined to traverse at least one of cells of the circuit design.

In certain embodiments, the method may include executing a processor to selectively determine at least one of the timing paths to be an inter-power domain (IPD) timing path according to predetermined IPD criteria. The IPD criteria may include traversal by a timing path through at least one multi-supply element, and a timing path being a capture clock path for a second timing path traversing through at least one multi-supply element.

In certain embodiments, the method may include pruning the netlist to selectively enable each said IPD timing path for a multi-domain timing analysis.

In certain embodiments, the method may include executing a processor to selectively actuate the multi-domain timing analysis based on each said IPD timing path.

While not limited thereto, yet another disclosed embodiment is directed to a system for multi-domain timing analysis of a circuit design having a plurality of interconnected cells and a plurality of power domains therefor. The power domains may establish respective non-ground voltages provided by different power supplies.

In certain embodiments, the system may include a netlist generator executable to establish a netlist defining the cells of the circuit design. A plurality of timing paths may each be defined to traverse at least one of cells of the circuit design.

In certain embodiments, the system may include an inter-power domain (IPD) configurator executable to selectively determine at least one of the timing paths to be an inter-power domain (IPD) timing path according to predetermined IPD criteria. The IPD criteria may include traversal by a timing path through at least one multi-supply element. Each multi-supply element may include one or more cells energized by multiple power domains.

In certain embodiments, the system may include a timing analyzer executable to selectively actuate at least one multi-domain timing analysis based on each said IPD timing path.

Additional aspects, details, and advantages of the disclosed system and method will be set forth, in part, in the description and figures which follow.

DETAILED DESCRIPTION OF THE PREFERRED EMBODIMENTS

Figure 1:
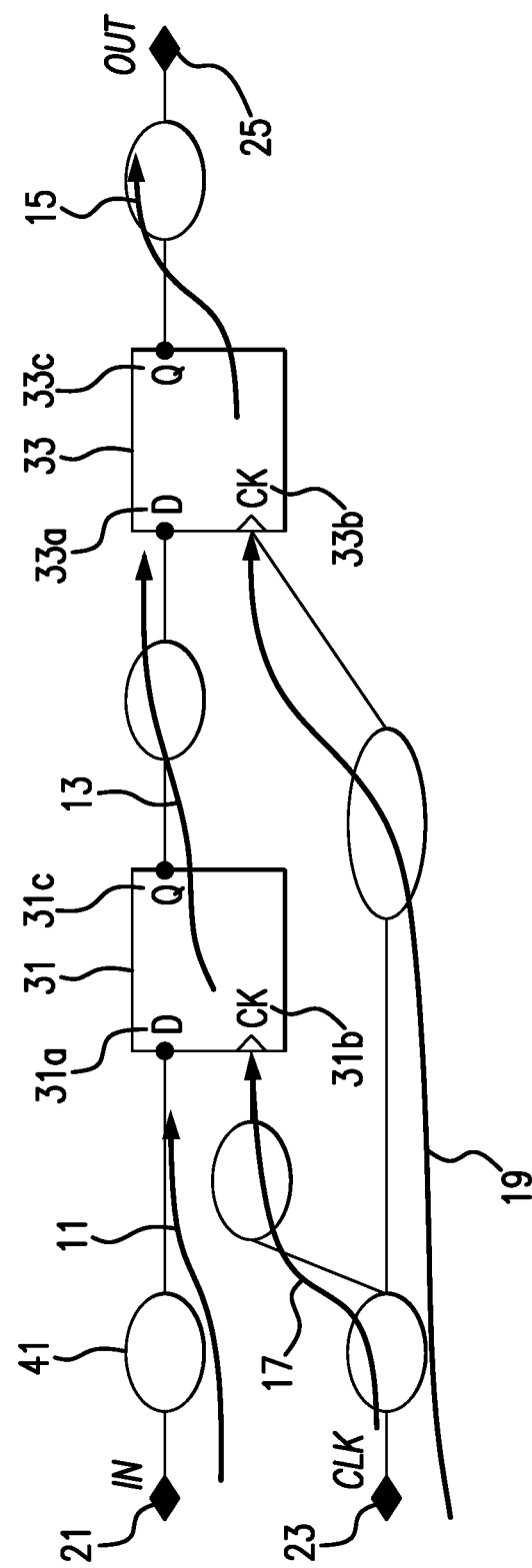
FIG. 1 is a circuit diagram illustrating an example circuit block and the paths traversing it.

Reference will now be made in detail to exemplary embodiments, which are illustrated in the accompanying drawings, wherein like reference numerals refer to the like elements throughout. The embodiments are described below in order to explain the disclosed system and method by referring to the figures.

Section headings are included in this Detailed Description. It is noted that these section headings are for convenience only and should not be interpreted as limiting the scope of the claimed invention in any way.

A circuit design may have a plurality of power domains, each power domain defined as the portion of the design energized by an independent source of power which may vary in supply voltage, or reference voltage, from other sources in other timing domains. Because of this possible variation in voltage, a timing analysis of the circuit design cannot assume that the supply voltage other than the ground (or zero reference voltage) throughout the circuit is constant. Rather, the analysis must account for the possibility that different domains may have different supply voltages; for instance, that one may be at a maximum reference voltage level while another is at a reference minimum in addition to a ground or zero reference voltage.

The supply voltage of a power domain affects the timing behavior of a signal traveling within it. When a signal travels between power domains, the voltages of both power domains must be accounted for, and these voltages may be different. However, a timing analysis measures the timing behavior at certain key points in the circuit design, where a concept called a "timing path" defines a traversal of the logic components and interconnections between said measurement points. It is therefore possible to isolate the effects of multiple voltages on the timing paths which cross between power domains; that is, inter-power domain (IPD) paths. Once these IPD paths, and the logic and interconnections they traverse, are properly identified, a more efficient timing analysis may examine the effects of voltages in combination on these IPD paths, along with certain related paths. The non-IPD paths may be divided by power domain, and the efficient timing analysis may treat each set of domain paths as if it constitutes part of a smaller circuit having a single power source.

1. Static Timing Analysis

Embodiments of this invention may be applied to a static timing analysis (STA). Generally, STA is a methodology, well-known in the art, to assess the timing of any given digital circuit using software techniques and certain models that provide relevant characteristics of the digital circuit. At the highest level of analysis, STA considers the timing of a signal over all possible paths through the circuit to confirm that said timing meets the requirements of the design, and in some cases determine whether synchronization measures such as holds are needed. STA is conducted by breaking down the design into circuit paths, calculating timing delays through each path, and comparing the delays to applicable timing requirements.

The principles of the invention and the embodiments disclosed herein may also be applied to other forms of circuit analysis, such as dynamic timing analysis, with appropriate alteration. For convenience and brevity of illustration, however, these disclosures will generally assume a static timing analysis.

Certain concepts and terms of STA, and timing analysis in general, which are relevant to the present invention will now be described.

A digital circuit design may be divided into circuit blocks which may be represented individually by models, each model substituted for the actual block in the circuit design for analysis purposes. Dividing the circuit into circuit blocks may simplify several aspects of timing analysis and other analyses. By design, most principles of STA are equally applicable to an analysis of a circuit block and of an entire circuit, and the specification will therefore treat the two as interchangeable save where the distinction is noted to be relevant.

A circuit may include "flip-flops" which in the context of testing are used to capture and/or launch signals for testing purposes, such as confirming that the timing of the signals meets the requirements at specific measurement locations in the circuit.

FIG. 1 is a diagram illustrating paths through a simple example circuit block. The example circuit block includes an input port 21 receiving input from outside the circuit block which is fed to a data pin (D-pin) 31a of a capturing flip-flop (or register) 31. An output pin (Q-pin) 31c of the capturing flip-flop 31 passes output to a data pin 33a of a launching flip-flop 33. An output pin 33c of the launching flip-flop 33 passes output to an output port 25 of the circuit block, and from there out of the circuit block. Additionally, a clock source or clock port 23 provides a clock signal to a clock pin (CK-pin) 31b of the capturing flip-flop 31 and a clock pin 33b of the launching flip-flop 33. Note that, in practice, a circuit block may have any suitable number of input, output, and clock ports, and any suitable number of capturing and launching flip-flops, depending on the requirements of a particular intended application.

Other suitable logic may be also implemented in the regions of the example circuit block represented by ellipses, such as logic 41. Both flip-flops and other logic elements such as gates or composite gates may be referred to as "cells," and a cell in combination with its output interconnect structure, if any, may form a "stage." Each starting and ending pin, or start point and end point, of a stage would define a "node." A node may serve as both the ending pin of one stage and the starting pin of another, and a stage may have multiple starting pins or ending pins.

A path defines a series of connected stages, or more accurately a signal traversal traversing this series, and may be represented by a sequence of pins. The path defined by n pins can be represented as $P_{1\rightarrow n}=\{p1, p2, \ldots, pk, \ldots, pl, \ldots, pm, \ldots, pn\}$. The pin p1 represents the first pin of the path, also termed an input pin or source pin (these terms will be used interchangeably hereinafter), and the pin pn represents the last pin of the path, also termed an output pin or sink pin (these terms will be used interchangeably hereinafter). For instance, in the example circuit block of FIG. 1, input pin 21 may define a source pin of a path 11 through logic 41, and data pin 31a may define the sink pin of said path. Logic 41 itself may have any number of additional pins between the source and sink. Generally, a path may be divided into smaller paths or combined with other paths into longer ones.

A timing path is a specific kind of path that starts at any of an input pin of the circuit block, such as input port 21, a clock port of the circuit block, such as clock source 23, or at a clock pin of a flip-flop, such as pins 31b or 33b. Additionally, a timing path ends at any of a clock pin of a flip-flop, such as pins 31b or 33b, a data pin of a flip-flop, such as pins 31a or 33a, or an output pin of the circuit block, such as output port 25. In FIG. 1, timing paths include paths 11, 13, 15, 17, and 19. It is noted that timing paths starting at a flip-flop are not considered to start at the output pin or data pin of a flip-flop, but at the clock pin of the flip-flop, regardless of the internal arrangement of the flip-flop.

In a timing analysis, the concept of the timing path is used to analyze the timing of a signal moving between the source and sink of the paths. There may be numerous sequences of stages between a source pin and sink pin, depending on the complexity of the logic therebetween. Therefore, to conserve analysis time, a timing analysis preferably considers only a worst-case timing path—that is, the sequence of stages which a signal will take the most time to traverse—between each such pair of source and sink. For instance, although there may be multiple routes through logic 41 that a signal may take between input port 21 and data pin 31a, only the worst such route, indicated by timing path 11 for the purposes of illustration, will define the timing path between the two during at least some portions of a timing analysis.

It is noted that the term "worst" may mean "slowest/latest," "fastest/earliest," or simply "farthest from the ideal," as it is possible for a signal to arrive either too early or too late. In certain cases, there may be two "worst" cases: the fastest and the slowest. The most applicable meaning will be apparent to those of skill in the art in each specific application of a given embodiment.

As used herein, the term "data path" means a timing path that ends at a flip-flop data pin or a circuit block output port; generally, data paths start from either a circuit block input port or a flip-flop clock pin. In the illustrated example circuit block, data paths include an input data path 11 from the input port 21 to the data pin 31a of the capturing flip-flop 31, an output data path 15 from the clock pin 33b of the launching flip-flop 33, and an internal data path 13 from the clock pin 31b of the capturing flip-flop 31 to the data pin 33a of the launching flip-flop 33.

As used herein, the term "clock path" means a timing path starting at a clock source and ending at a flip-flop clock pin. For instance, in the example circuit block of FIG. 1, clock paths 17 and 19 begin at clock source 23, with clock path 17 ending at clock pin 31b of capturing flip-flop 31 and clock path 19 ending at clock pin 33b of launching flip-flop 33. A clock path extending from a clock source to the clock pin of that flip-flop from which a data path starts—the launching flip-flop of said data path—is termed the "launch clock path" for that data path, while a clock path extending from a clock source to the clock pin of that flip-flop at which a data path ends—the capturing flip-flop of said data path—is termed the "capture clock path" for that data path. It is noted that a clock path may serve both tasks: in the example circuit block of FIG. 1, clock path 17 serves as the capture clock path for data path 11 and the launch clock path for data path 13, while clock path 19 serves as the capture clock path for data path 13 and the launch clock path for data path 15. When modeling the circuit block for analysis, the clock sources are defined by the user as linked to some pins of the design, along with other clock attributes like clock period and duty cycle. Representations of the clock sources, with attributes such as frequency, may be either generated or defined in the model or in a constraint-definition file; all such representations are referred to as "generated clocks."

As used herein, the term "interface path" means a timing path that either starts at a circuit block input port or ends at a circuit block output port. That is, either the source or destination of the signals on an interface path is outside the circuit block. Interface paths may be of several types: input port to flip-flop (such as data path 11), flip-flop to output port (such as data path 15), or input port to output port. It is noted that timing paths from a flip-flop to another flip-flop within the given block do not represent interface paths, as they do not enter or exit the circuit block. Therefore, in the example circuit block of FIG. 1, timing path 13 is not an interface path.

Again, it is noted that timing paths originating in a flip-flop are considered to start at the clock pin of said flip-flop. It is also again noted that two paths may be combined into a larger path if the ending pin or endpoint of one is the starting pin or startpoint of the other. Therefore, a clock path, which concludes at a clock pin of a flip-flop, may be combined with a data path, if any, that starts at the same clock pin; that is, a data path may be combined with its launch clock path into a larger timing path. However, a clock path always begins at a clock source, which cannot be the endpoint of any timing path in a circuit block, and a data path always ends at a flip-flop data pin or a circuit block output port, neither of which can be the startpoint of any timing path in the circuit block. Therefore, the combination of a clock path and the data path it launches cannot be further joined with other timing paths. As used herein, this combination is termed a "complete timing path." In FIG. 1, the combination of clock path 17 with data path 13 is a complete timing path, as is the combination of clock path 19 and data path 15.

A timing path is also a complete timing path if it is a data path that begins at a circuit block input port, such as data path 11, as such a data path has no launch clock path and therefore no timing path it could combine with to form a larger path.

A timing path is also a complete timing path if it both starts and ends at a port of the circuit block, rather than at a flip-flop. No such path is depicted in FIG. 1.

Static timing analysis can employ a gate-level netlist style of model, which will be assumed throughout this disclosure for convenience and clarity purposes. However, it is noted that the disclosed embodiments may be adapted to other models and forms of analysis.

Figure 2:
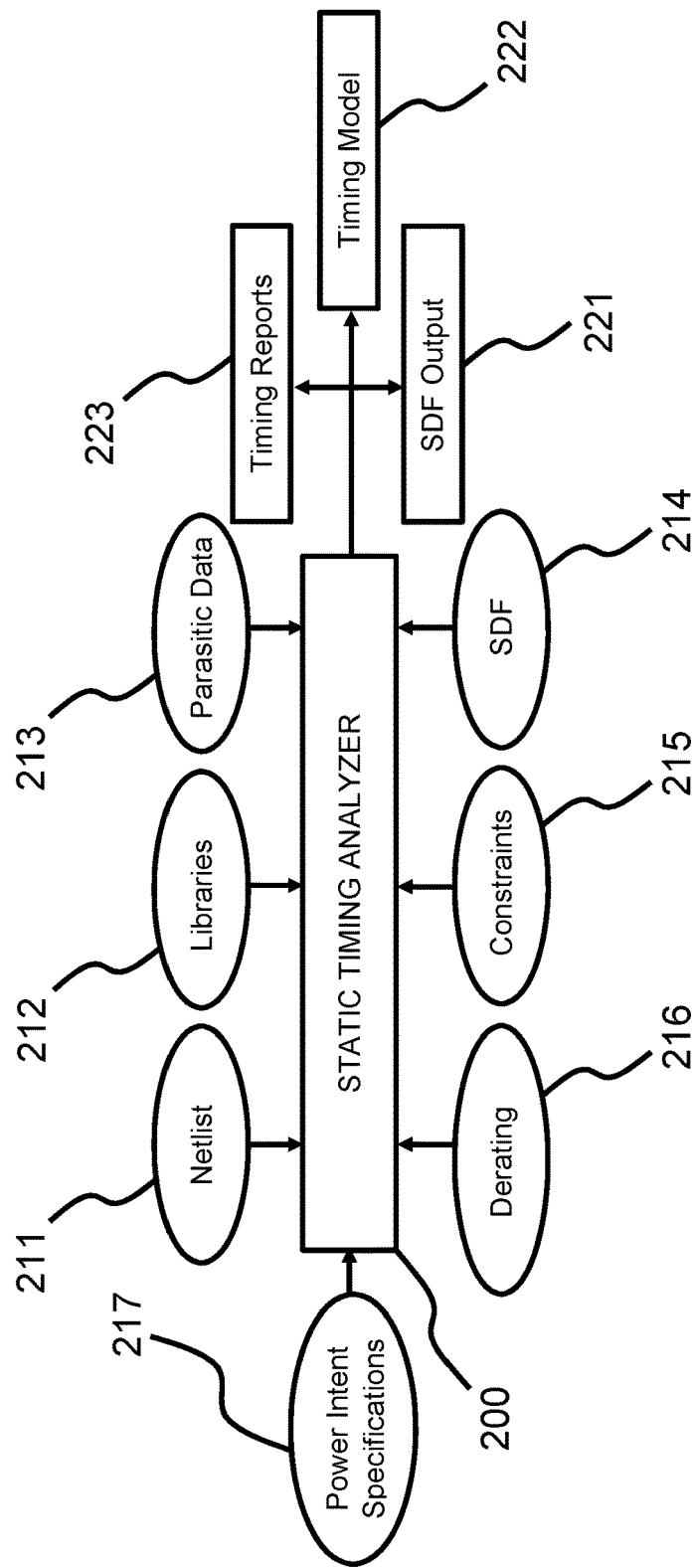
FIG. 2 is a flow diagram illustrating inputs and outputs of an example static timing analyzer.

FIG. 2 illustrates a flow of information in and out of an example static timing analyzer 200.

The static timing analyzer 200 may receive multiple inputs which are combined to form a complete model of a circuit or circuit block for simulation. One input is the netlist 211, which is a digital model of the arrangement of components in the circuit or circuit block. A gate-level netlist represents the circuit as a set of gates or cells and the interconnections therebetween, with each gate and interconnect defined by type and particular characteristics. The netlist may organize these gates and interconnections into timing paths, for instance of the type described above. Said organization may be included in the initial netlist, or occur as part of an initial analysis of the netlist, such as a graph based analysis. Establishment of such a netlist may be done manually by the circuit designer, or by means of a netlist generator performing an initial examination of the circuit information. Specific methods of establishing a netlist are known in the art.

During modeling, a gate-level netlist is combined with one or more library models 212 (or, more simply, libraries) which are also provided as input. The libraries define the features of each type of gate as they would affect a signal traveling through; for example, the netlist might say that an AND gate is located at a particular point in the circuit, while a library model in turn says how a signal behaves when moving through that or other AND gates. Existing formats for modeling gate data include, but are not limited to, Liberty (.lib), MACROS, AOCV, and CDB. Existing libraries are available in each format for common gates and components, while uncommon components may require additional models generated by an engineer.

Another input is the parasitic data 213 (or, more simply, parasitics), which define features of the interconnections in between the gates which would affect a signal, such as resistance, capacitance, and inductance. Similar to the library models, this information is combined with the locations of said interconnections as provided by the netlist. One existing format for modeling parasitic data is the Standard Parasitic Exchange Format (SPEF), although others are also available and applicable to the disclosed embodiments.

Existing delay or synchronization, such as from previous circuit blocks, may be an additional input 214. One existing format for modeling this delay is the Standard Delay Format (SDF), as is depicted in FIG. 2, although others are also available and applicable to the disclosed embodiments. The delay input may also define the delay of the components in the circuit block, either in terms of how a type of component delays a signal generally, or how a particular component delays the signal. However, in some embodiments, the library models 212 and/or parasitic data 213 may be able to express these component delays.

Constraints 215 may also be supplied as input, and define the desired timing behavior of the circuit, either generally or under specific conditions. For instance, a constraint may define the necessary timing window within which multiple signals, such as a data signal and a clock signal, must all reach a component, or the maximum acceptable time for a signal to travel the length of the circuit block. In other words, a sign-off of a circuit block preferably requires that the timing characteristics of the circuit block, as determined by a timing analysis, match the provided constraints. Additional constraints may also define the starting timing characteristics, such as clock frequencies and starting values.

Yet another input may be timing derating 216, which sets allowances for variation in the features of the gates, interconnects, or both from the standard definition. That is, the derating allows that a real-world component is inexactly constructed and may vary from the model by a margin of error. However, in some embodiments, the library models 212 may be able to express this margin and a separate derating input 216 is not required.

Still another input may be power intent specifications 217, which define the power requirements of, and power supplies to, the components of the circuit block. One existing format for these specifications is the Unified Power Format, although others are also available and applicable to the disclosed embodiments. However, in some embodiments, the library models 212 may be able to express these specifications and a separate specification input 217 is not required.

Using some or all of the above inputs, a timing analyzer 200, or static timing analysis module, may generate various types of output depending on the configuration. An SDF output 221 may define the delay of signals as they exit a circuit block, which may be input into a latter circuit block, allowing for a modular or piecemeal analysis of a larger circuit. A timing analyzer may also combine the inputs into a timing model 222, such as an extracted timing model (ETM) or interface logic model (ILM), which can be employed to streamline later analysis, especially at the top level of the design where models of individual circuit blocks are combined into a model of a complete circuit.

More immediately, a timing analyzer may generate timing reports 223, which include statements whether the timing of each timing path in the circuit block meets the provided constraints. Again, the success or failure of these timing paths to meet the constraints may be used to determine whether to sign off on the circuit block as an approved design. Additionally, in the event of a failure—a timing violation—of a timing path, a circuit designer will know to reexamine the components traversed by that timing path for design improvement.

A timing analysis may use graph-based analysis (GBA) to generate a timing report. In GBA, the timing analysis generates a timing graph for the given netlist and then computes the worst arrival and required times on the nodes of the graph. For nodes that are sinks of a timing path, it also computes the worst slack, slack being the difference between a desired arrival time (as defined by the constraints; usually, synchronized with the arrival time of a second signal) and the actual arrival time. In doing so, worst-case timing paths are determined which will be employed in the next stage. The computations employed are well-known in the art and, for reasons of brevity, will not be elaborated upon here.

The GBA identifies timing paths with apparent timing violations, where the computed timing is not within the margins allowed by the constraints. In some embodiments, GBA will also, or alternatively, identify a set of the worst timing paths in terms of slack, for some number of timing paths which is preferably selected to exceed an expected number of timing violations.

GBA makes certain pessimistic assumptions about the behavior of each stage. For example, it may assume that the input slew—the time it takes a signal to "ramp up" from "off" to "on," or "ramp down" from "on" to "off"—to be at its worst for each gate within a timing path. Other, similar assumptions may also be made. This allows GBA computations to operate comparatively quickly, but at the cost of sometimes reporting a "false" timing violation where a more exact analysis would have shown that the timing path meets the constraints.

A timing analysis may also use path-based analysis (PBA) to generate a timing report. PBA performs similar computations to GBA, but takes into account the input slew and other variables that would actually be encountered in a timing path, rather than simply assuming the worst case slew of all inputs as GBA pessimistically would. These more complex computations take considerably longer than those of GBA, and if applied to all paths in the circuit would require an excessive amount of runtime and processing power.

In other words, GBA may be considered a coarse filter, approving of timing paths that clearly do not have timing violations, and PBA may be considered a slower but finer filter.

Due to the respective advantages and disadvantages of GBA and PBA, it is preferable to combine the two. First, a GBA analysis returns a coarse timing report, and then any timing path with an apparent timing violation in said report is re-analyzed under a path-based analysis (PBA). In some embodiments, PBA will instead re-analyze the set of the worst timing paths as provided by the GBA.

By re-analyzing the apparent violations without the pessimism of GBA, PBA may determine that a timing path with an apparent timing violation does not in fact violate the provided constraints, and therefore does not require the attention of a circuit designer. However, because PBA analyzes only the worst-case timing paths that have apparent timing violations (or that are in the worst set), this being a much smaller set of paths than those analyzed in the GBA stage, the additional computations of PBA are not overly burdensome to the overall analysis.

Even with this combined approach, the timing reports reflecting the results of both analyses may still be output, so that designers may consider both the pessimistic GBA results and narrowed PBA results. The designers may even, depending on the number of violations from the GBA analysis, find PBA unnecessary for a particular design.

Because the applied supply voltage will affect the timing of signals through the circuit, and the supply voltage may vary within a range, both analysis stages are preferably conducted at least twice in accordance with the supply voltage: once at a maximum voltage of the range, and once at a minimum voltage of the range. By testing under at least the extreme or "corner case" voltages, it can be assumed that the worst-case timing conditions will be among the results. Interim supply voltages can also be tested for additional testing precision, especially if these interim voltages are commonly applied in practice, although this will increase the total analysis runtime. Similarly, other conditions that vary and that affect the timing of signals, such as operating temperature, are preferably also tested in "corner case" conditions.

2. Multiple Voltage Designs

Different components in a circuit design may have different power requirements. Additionally, it may simply be necessary to apply different power supplies to different portions of the circuit, even when they have the same power requirements. A multiple voltage design has more than one power source and is thereby divided into different power domains each receiving power from a different source. However, signals may still travel between the domains, and in many circumstances, the circuit cannot be conveniently divided into circuit blocks of only one domain each for analysis purposes. An analysis of the circuit block must therefore account for multiple domains.

A component is "in" or "part of" a power domain if it is energized by the power domain; that is, energized by the power source or power supply that supplies the power domain.

Power domains are preferably defined by the power intent specifications 217, as depicted in FIG. 2, although they may also be defined by the library models 212. The power domains preferably define a list of all components in the domain, a power source for the domain, and a supply voltage or voltage range for the power source.

The boundaries between power domains are defined by multi-supply elements which are designed to handle the conflicting supply voltages of the separate domains and be energized by the power supplies of both. These multi-supply elements may be thought of as bridges or transitions between the domains, allowing a signal to cross from one domain to another, and may include level shifters, nets, macros, or the like with varying input and output voltages. It is noted that a multi-supply element may include a combination of cells or stages rather than an individual cell or stage, as the terms are defined herein. Either the library models 212 or the power intent specifications 217, as depicted in FIG. 2, may define which types of elements are multi-supply elements. Additionally, either the power intent specifications 217 or netlist 211 may define specific elements in the netlist that, although not normally multi-supply elements, have been configured for this purpose.

Figure 3A:
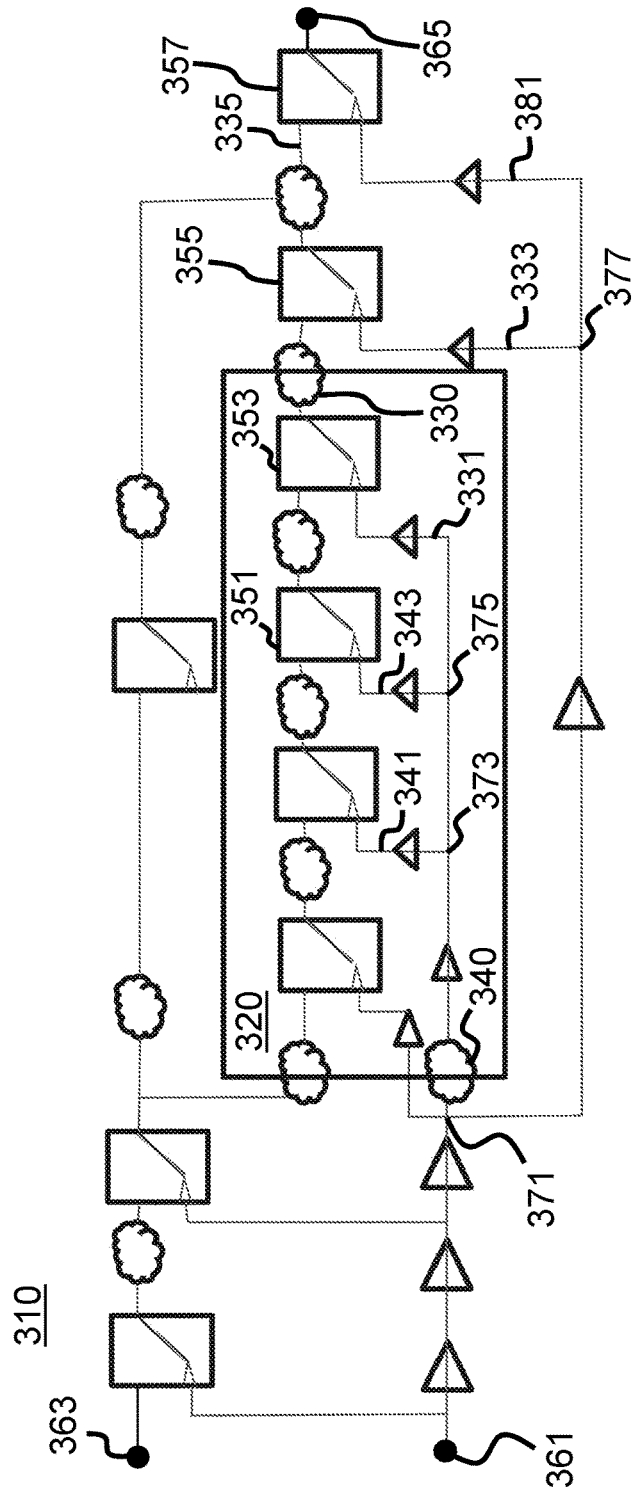
FIG. 3A is a circuit diagram illustrating an example multiple voltage circuit block and the logic within it.

FIG. 3A depicts a simple example circuit with two power domains, a first power domain 310 encompassing a second power domain 320. The circuit itself includes a clock source 361, an input port 363, and an output port 365. Other elements of the circuit will be described later herein.

As previously described, it is preferable to analyze a circuit under at least a maximum and minimum non-ground supply voltage. However, when more than one power domain is present, it cannot be assumed that all power domains will be at a maximum or minimum supply voltage at the same time. Some may operate at, or close to, a maximum, while others may operate at, or close to, a minimum. Therefore, assuming interaction between all domains, it is important to analyze the circuit under all combinations of voltages.

It is also noted that constraints and other inputs may also vary due to different supply voltages and combinations thereof. For instance, different derating values or clock frequency constraints may be applicable based on the specific supply voltages, and may even be different within each power domain.

If M denotes the number of tested operating voltages for each power domain, and N denotes the number of domains, the number of combinations to analyze would equal $M^N$. Even when only testing the maximum and minimum voltages for each domain, the number of combinations will equal $2^N$, meaning that the number of combinations will increase exponentially with the number of power domains. Under conventional methodologies, the analysis is completely repeated for each combination, making the analysis runtime proportional to the number of combinations $2^N$. For even an ordinary number of domains N, such as 5, this results in an unacceptably large increase in analysis runtime.

3. Inter-Power Domain Logic

In a multiple voltage design, at least some of the components are isolated to a single power domain and do not interact with other domains. Combinations of supply voltages only have a direct effect on logic traversed by a timing path crossing between domains, or by certain related timing paths thereof. These timing paths may be termed inter-power domain (IPD) timing paths, and any components, both cells and interconnects, traversed by an IPD timing path may be termed IPD logic.

As used herein, IPD logic is traversed by an IPD path, and conversely components defining an IPD path are IPD logic. Therefore, an IPD path and the collective IPD logic traversed by it are referred to interchangeably hereinafter.

Figure 4:
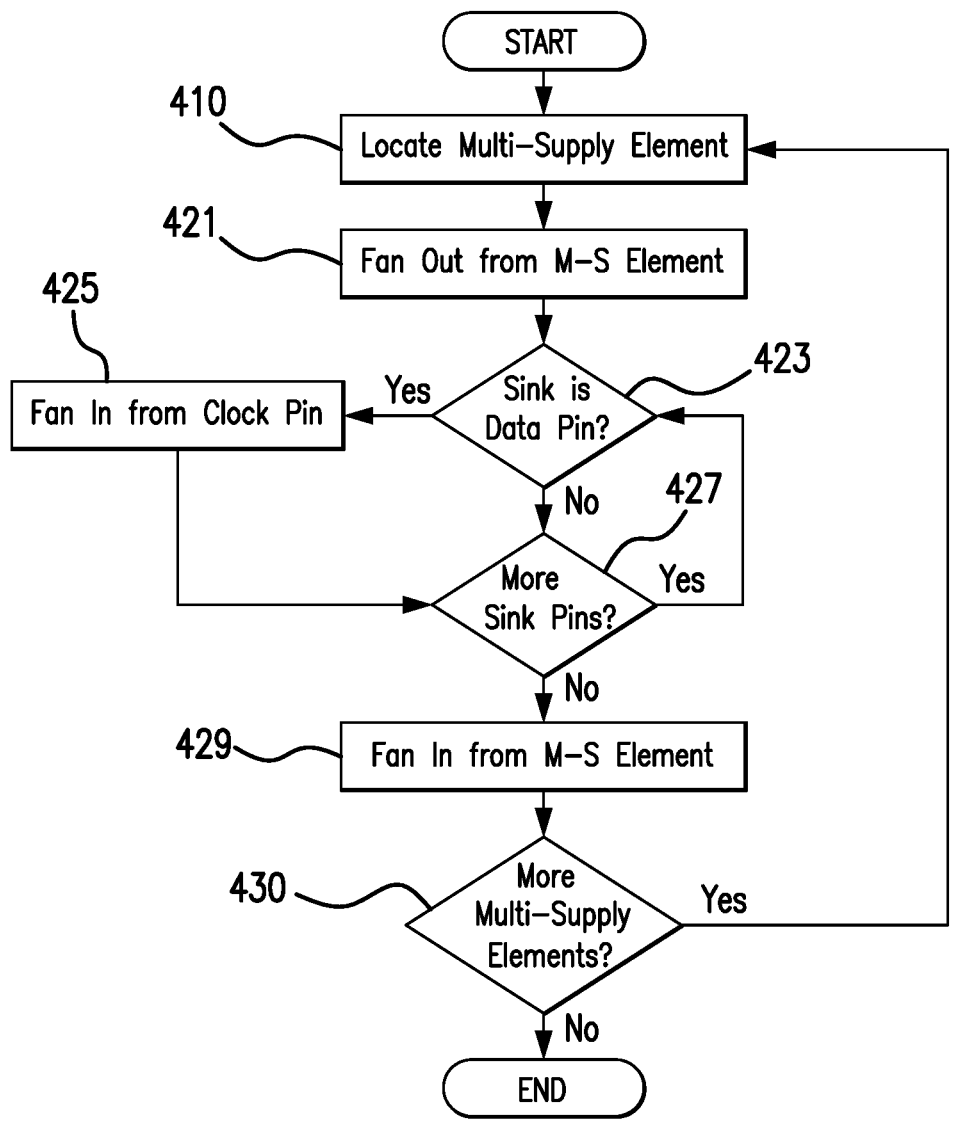
FIG. 4 is a block flowchart illustrating a method of identifying IPD logic in a circuit design, in accordance with an embodiment of the present invention.

FIG. 4 is a flowchart of a method for identifying IPD logic in a circuit design, according to an exemplary embodiment of the present invention.

Preferably, one criterion which may define a timing path as an IPD path is whether the path traverses a multi-supply element. As noted previously, these elements are suitably defined by element type in the library models or power intent specifications, and may also be individually flagged as multi-supply in the power intent specifications or netlist.

When a multi-supply element is located in the netlist, at block 410, a "fan-out" operation is performed on the netlist at block 421, following the sequence or sequences of components, such as cells or stages, forward (that is, in the direction of signal propagation) from the multi-supply element until each sequence reaches a flip-flop data pin or output port; that is, the sink of a data path. Similarly, a "fan-in" operation is performed on the netlist at block 429, following the sequence or sequences back (that is, contrary to the direction of signal propagation) from the multi-supply element until each sequence reaches a clock source, the source of a clock path, or input port, the source of a data path with no launch clock path. Each combination of source and sink so located defines a complete timing path traversing the multi-supply element, which is an IPD path. Therefore, the various components, including gates and interconnects, traversed by these paths are marked as IPD logic in the netlist as part of the fan-in and fan-out operations 421 and 429. It is noted that a fan-out or fan-in might follow multiple paths forward or back, respectively, and will therefore encounter multiple sources or sinks defining multiple complete timing paths.

Preferably, if a data path is part of an IPD path, its capture clock path is also marked as IPD, according to an additional IPD criterion. Therefore, at the end of a fan-out 421, it is checked whether a given detected sink pin is a flip-flop data pin, at block 423. If so, the IPD path ending at said sink concludes with a data path captured in the circuit block, so a fan-in operation is conducted from the clock pin of the same flip-flop at block 425, marking the components traversed by the capture clock path of the data path as IPD. No fan-out operation is similarly performed, as the sink of the capture clock path is the clock pin In either case, it is then checked whether there are more sink pins for the multi-supply element at block 427, and if so, the process returns to block 423 to see if the next sink pin is a data pin. Otherwise, the process advances to the fan-in operation 429.

Once the fan-out and fan-in operations 421 and 429, as well as any supporting fan-in operations 425, are completed for the multi-supply element, it is checked whether there are any more multi-supply elements in the design of the circuit block at block 430. If so, the process returns to block 410 to locate the next multi-supply element. If not, all IPD logic is properly marked in the netlist, and the process ends.

Referring again to FIG. 3A, using the above process, an element in logic 330 is determined to be a multi-supply element. A fan-out from said multi-supply element ends at the data pin of flip-flop 355, while a fan-in travels back through the Q-pin and clock pin of flip-flop 353, through junctions 375, 373 and 371, and finally arriving at clock source 361. This defines a complete timing path 331 between clock source 361 and the data pin of flip-flop 357, which is therefore an IPD timing path, and all elements on this path are marked as IPD logic.

Additionally, because the sink, or end, of the IPD timing path is a data pin (of flip-flop 355), a fan in from the corresponding clock pin (also of flip-flop 355) is performed, traveling back through junctions 377 and 371 to also reach clock source 361, and thereby marking the logic of this capture clock path 333 as IPD logic. Because there is no fan-out for the capture clock path, the timing path 335 between flip-flops 355 and 357 is not part of an IPD path and its elements are not marked.

It is noted that there is overlap between complete timing path 331 and capture clock path 333 in the logic between clock source 361 and junction 371. The components on this overlapping segment need only be marked as IPD logic once.

Another element in logic 340 is also determined to be a multi-supply element. (This element is already part of timing path 331, but must also be checked separately.) Using a fan-out from said multi-supply element locates three separate sinks or endpoints, because the path forward divides at junctions 373 and 375. A fan-in, meanwhile, locates clock source 361 as the only source. Therefore, the logic on the complete timing path 341 between clock source 361 and the data pin of flip-flop 351 is IPD, as is the logic on the complete timing path 343 between clock source 361 and the data pin of flip-flop 353. The logic between clock source 361 and the data pin of flip-flop 355 (that is, timing path 331) is also IPD, but has already been completely marked as such during the examination of the multi-supply element in logic 330.

Furthermore, all three sinks are data pins, and therefore fan-ins from the corresponding clock pins should be performed. In this case, the capture clock path ending in flip-flop 355 is clock path 333, which was already completely marked during the exploration of the multi-supply element in logic 330. The capture clock paths ending in flip-flops 351 and 353, meanwhile, happen to be part of complete timing paths 343 and 331, which have also already been marked. Therefore, in this example, the capturing clock fan-ins detect no new IPD logic to mark.

Similar operations are preferably conducted for all multi-supply elements; that is, all points in the circuit block where a path crosses between power domains. As shown for the multi-supply element in logic 340, it is important to do so even for multi-supply elements which have already been marked as IPD logic.

Figure 3B:
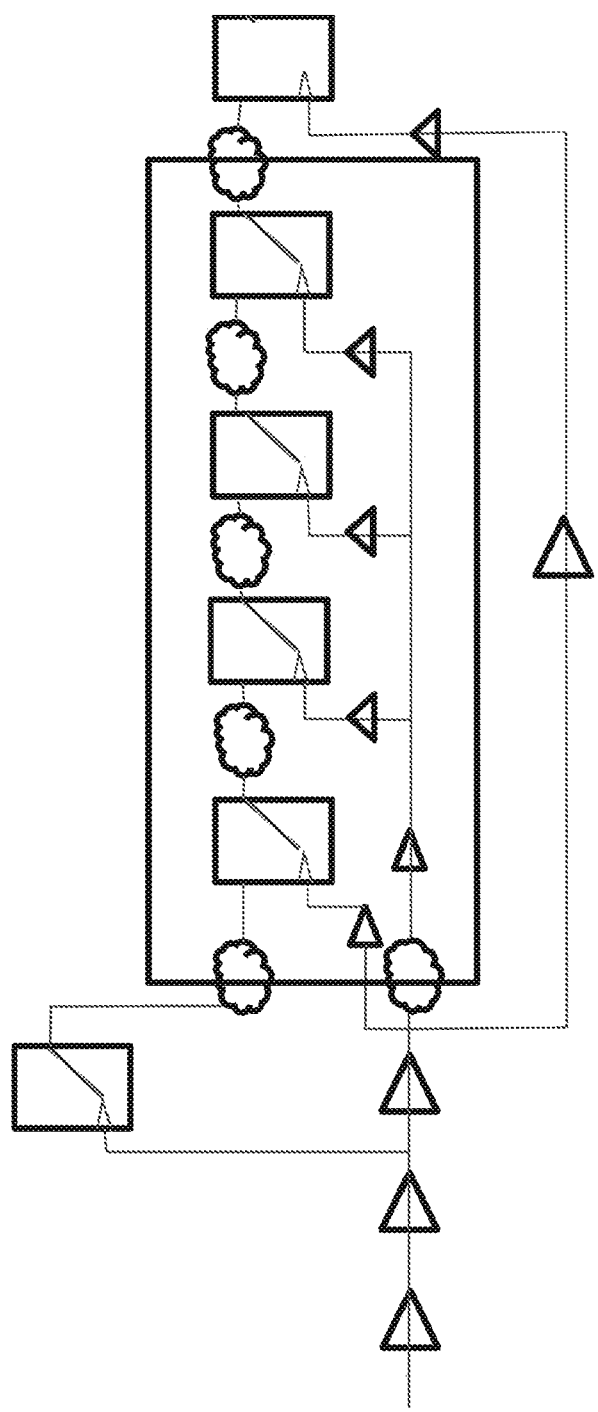
FIG. 3B is a circuit diagram illustrating IPD logic of the example multiple voltage circuit block of FIG. 3A.

FIG. 3B depicts only the IPD marked elements of the example multiple voltage circuit block of FIG. 3A, at the conclusion of the process depicted in FIG. 4.

Empirical testing has determined that only 2%-25% of a circuit's logic is typically IPD in many applications. By identifying the IPD paths and logic of a circuit, and restricting multi-domain timing analysis—that is, timing analysis considering all power domains under all supply voltage combinations—only to these paths and logic, the runtime cost of such an analysis may be at least partially ameliorated.

Timing paths may also be identified as non-IPD. A complete timing path is non-IPD, and its elements are non-IPD logic, if it remains in one power domain for the length of the complete timing path. It is noted that a timing path may cross into a second domain, disqualifying it from being a non-IPD path, even though it then crosses back to the first domain before reaching its sink. The non-IPD paths and logic for each power domain may be analyzed in a more traditional, single-domain timing analysis.

It is also noted that a capture clock path for an IPD complete path may also qualify as non-IPD under the above standard. For instance, capture clock path 333 in FIG. 3A remains in the first power domain 310 from source to sink. Capture clock path 333 is preferably still analyzed as part of the IPD logic, but may also be analyzed during a single-domain timing analysis of the first power domain.

Figure 5:
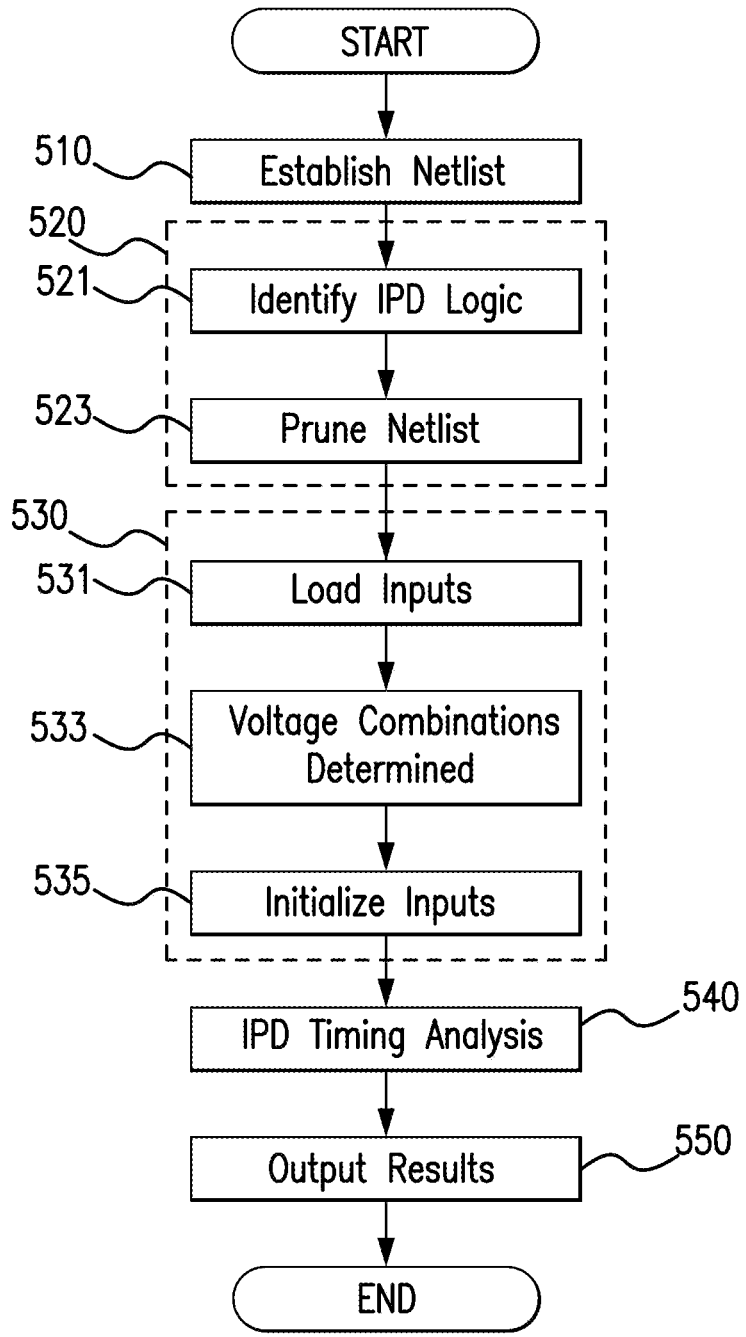
FIG. 5 is a block flowchart illustrating a method of performing one or more timing analyses on a multiple voltage circuit design, in accordance with an embodiment of the present invention.

FIG. 5 is a flowchart of a method realized in accordance with one exemplary embodiment of the present invention for identifying IPD logic in a circuit design and performing one or more timing analyses accordingly.

At block 510, the netlist for a circuit design is established, as described earlier in the disclosure. Other inputs, such as the constraints, libraries, and so forth, may also be established or otherwise prepared at this time.

At block 520, the netlist is generally reorganized according to any inter-power domain (IPD) logic.

That is, at block 521, the IPD logic is identified according to predetermined IPD criteria and is so marked in the netlist. This may be accomplished by a flow of processes and criteria such as depicted in FIG. 4, or by other suitable processes.

At block 523, the netlist is reduced or pruned to enable only the IPD logic. There are multiple approaches to accomplish this. In one example approach, any logic not marked as IPD logic is removed from the netlist completely, leaving only the IPD logic, and thereby conserving storage space and load time. In another example approach, the marked IPD logic is treated as enabled in a later timing analysis, and the non-IPD logic is treated as disabled, preserving data such as cross-coupling which may still be relevant to the IPD logic and thereby maintaining accuracy that might otherwise be lost. The second example approach also allows the enabling and disabling of logic to be temporary, which means that the same netlist may also be used in other operations where a complete and unpruned netlist is necessary.

The reorganization 520 may be carried out as part of, or in combination with, a partial or limited graph-based analysis (GBA) focused on identifying IPD timing paths rather than timing paths with apparent timing violations. This partial GBA need not consider the slack of the paths or whether it violates the timing constraints, but need merely define timing paths for further analysis according to the pruned netlist rather than the original netlist.

Returning to FIG. 3B, because it depicts only the IPD marked elements of the example multiple voltage circuit block of FIG. 3A, it also depicts the IPD logic; that is, the enabled logic following the reduction or pruning 523 described above. Preferably, the unpruned netlist, or a copy thereof, is also maintained with the IPD logic markings preserved. As noted previously, this unpruned, marked netlist may be equivalent to the pruned netlist if enablement is a temporary state.

Returning to FIG. 5, at block 530, a timing analyzer is initialized in preparation for the timing analysis.

That is, at block 531, the inputs, including the pruned IPD and internal netlists, are loaded to the timing analyzer, and at block 533, applicable voltages and voltage combinations are determined and configured.

At block 535, the inputs are initialized, with the libraries and parasitic data applied to the enabled logic of the pruned netlists. If the unmarked (non-IPD) elements were merely disabled, the disabled logic in the pruned netlist is ignored when loading the libraries and parasitic data. Runtime and memory are therefore conserved even under the approach of disabling the unmarked elements.

At block 540, a multi-domain or IPD timing analysis of the pruned netlist is conducted under all voltage combinations. This operation may include both graph-based and path-based analysis. Preferably, the voltage combinations are all analyzed in parallel using a Concurrent Multi-Mode Multi-Corner (C-MMMC) infrastructure, or other concurrent processing techniques.

At block 550, the timing analyzer outputs the timing reports, including all detected timing violations. These reports may be provided for all voltage combinations or for a selected subset. The process then ends.

4. System Implementations

These and other related processes, and other necessary instructions, may be encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software may reside as encoded information on a suitable non-transitory computer-readable tangible medium, such as a magnetic floppy disk, a magnetic tape, CD-ROM, or DVD-ROM.

Figure 6:
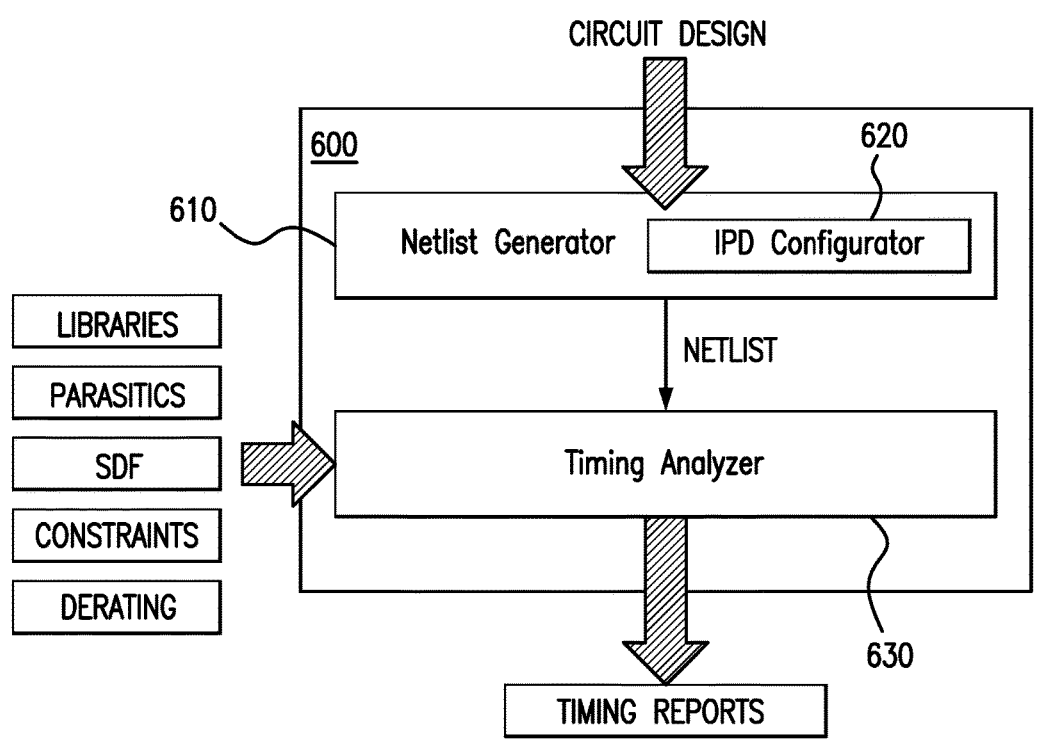
FIG. 6 is a block diagram illustrating a system for performing one or more timing analyses on a multiple voltage circuit design, in accordance with an embodiment of the present invention.

FIG. 6 depicts a system 600 implementing the above processes, according to an exemplary embodiment of the present invention. A netlist generator 610 receives information about a circuit design, including power intent specifications, and establishes the netlist for a circuit design, for instance as described in block 510 of FIG. 5 and elsewhere. The netlist generator 610 includes an inter-power domain (IPD) configurator 620, which determines which paths represented in the netlist are IPD paths and prunes the netlist, for instance as described in block 520 of FIG. 5 and elsewhere. The netlist generator 610 maintains the original netlist.

The IPD configurator 620 takes the netlist, or copies thereof, and performs the operations of block 520 to mark the netlist and generate pruned netlists. In other embodiments, the IPD configurator 620 may be a separate module.

The pruned IPD netlist is provided to a timing analyzer 630, which also receives other inputs such as those depicted in FIG. 2, and executes the remaining operations of FIG. 5 to produce the timing reports. The netlist generator 610 or IPD configurator 620 may also provide the timing analyzer 630 with the power intent specifications separately, or these specifications may be inherently described in the netlist.

In a hardware implementation, the system may suitably employ a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

Figure 7:
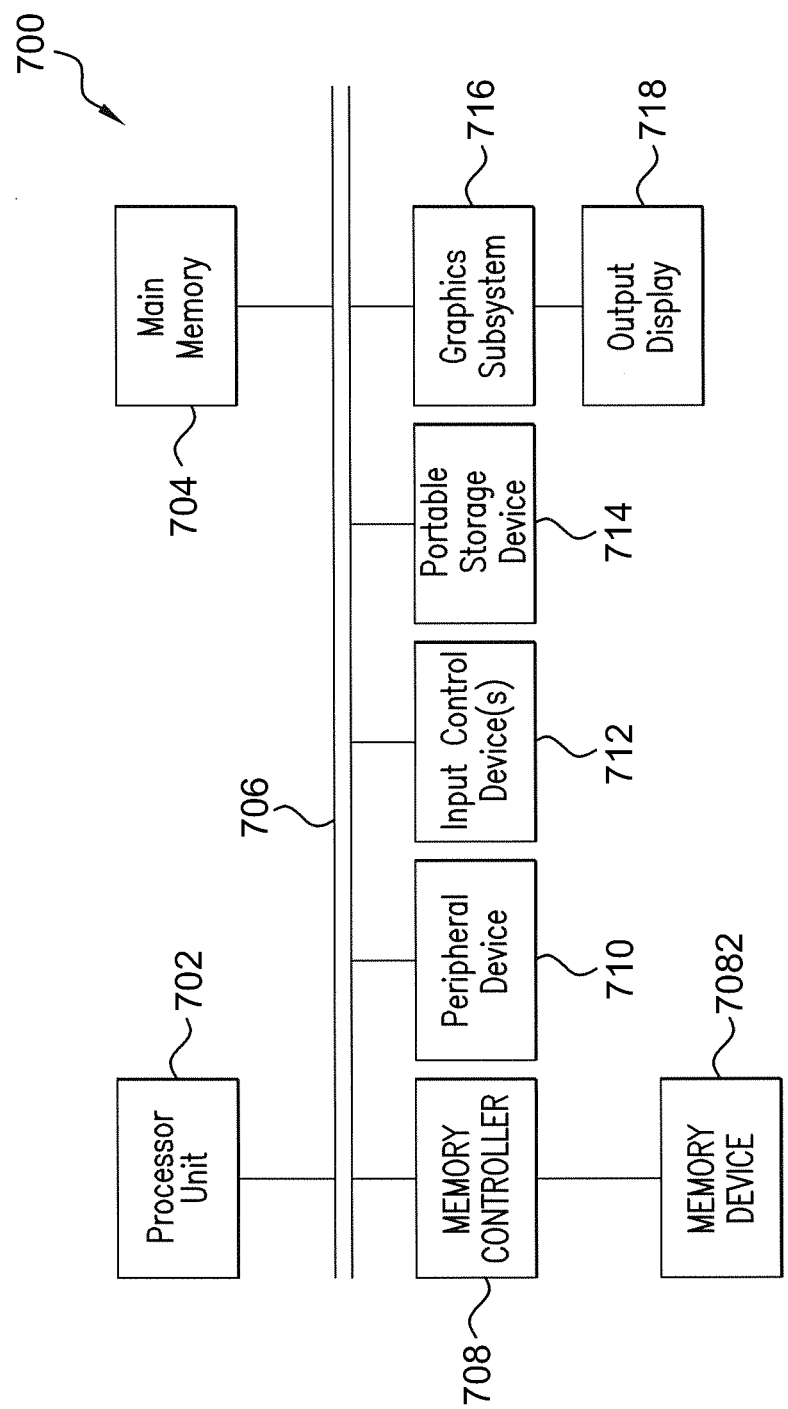
FIG. 7 is a block diagram illustrating an exemplary computer system for programmatic and/or hardware implementation of various embodiments and aspects of the present invention.

As an example, FIG. 7 is a block diagram illustrating an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 700 contains: a processor unit 702, a main memory 704, an interconnect bus 706, a memory controller 708 that is coupled to a memory device 7082, peripheral device(s) 710, input control device(s) 712, portable storage medium drive(s) 714, a graphics subsystem 716, and an output display 718. Processor unit 702 may include a single microprocessor or a plurality of microprocessors for configuring computer system 700 as a multi-processor system. Main memory 704 stores, in part, instructions and data to be executed by processor unit 702. Main memory 704 preferably includes banks of dynamic random access memory (DRAM) as well as high-speed cache memory.

For the purpose of simplicity, the components of computer system 700 are interconnected via interconnect bus 706. However, computer system 700 may be interconnected through one or more data transport means. For example, processor unit 702 and main memory 704 may be interconnected via a local microprocessor bus; and memory controller 708, peripheral device(s) 710, portable storage medium drive(s) 714, and graphics subsystem 716 may be interconnected via one or more input/output (I/O) buses. Memory device 7082 may be implemented as a nonvolatile semiconductor memory for storing data and instructions to be used by processor unit 702. Memory device 7082 may store the software to load it to the main memory 704 or may be represented in an EDA tool simulation by suitable classes (incorporating data structures and functions operable upon the data structures) or the like as would be known to one of skill in the art.

Portable storage medium drive 714 operates to input and output data and code to and from the computer system 700. In one configuration, the software is stored on such a portable medium, and is input to computer system 700 via portable storage medium drive 714. Peripheral device(s) 710 may include any type of computer support device such as an input/output (I/O) interface, to add additional functionality to computer system 700. For example, peripheral device(s) 710 may include a network interface card, to interface computer system 700 to a network. Peripheral device(s) may also include a memory controller and nonvolatile memory.

Input control device(s) 712 provide a portion of the user interface for a computer system 700 user. Input control device(s) 712 may include an alphanumeric keypad for inputting alphanumeric and other key information; and a cursor control device such as a mouse, a trackpad or stylus; or cursor direction keys.

In order to display textual and graphical information, computer system 700 contains graphics subsystem 714 and output display(s) 718. Output display 718 may include a cathode ray tube (CRT) display, liquid crystal display (LCD), plasma, or active matrix organic light emitting diode (AMOLED) display. Graphics subsystem 716 receives textual and graphical information, and processes the information for output to display 718.

5. Special Cases

When encountering a latch, IPD identification using the above methodology considers all branching of the latch, which can result in an excessively broad IPD netlist in certain cases. To alleviate this situation, input from an external user interface may be used to guide the IPD fan in and fan out processes and eliminate unnecessary branches, either manually, or by the addition or removal of IPD criteria to the method of FIG. 4 or others.

Similarly, scan chains may have IPD logic within, and if localized scan chains (e.g., IEEE 1500 standard) are not used, the reduction of the IPD netlist may be less than desired. Pins for scan chains are therefore normally provided a case value in advance, which adds an IPD criteria instructing the fan in and fan out processes to ignore the paths from the pins of the scan chain.

An IPD "side path" refers to a path that includes both IPD and non-IPD logic. For instance, complete timing path 381 of FIG. 3A has a source of clock source 361 and a sink of output port 365, traversing through junctions 371 and 377 and flip-flop 357. Complete timing path 381 includes IPD logic between clock source 361 and junction 377 as it shares this portion with IPD path 333, but does not include IPD logic between junction 377 and output port 365. Because they are not IPD logic, the components between junction 377 and output port 365 would not ordinarily be enabled in the IPD pruned netlist. However, an engineering change order (ECO) to an IPD path of an existing netlist may require that the IPD analysis consider the effects of the change on IPD side paths. Therefore, as an additional operation of IPD logic identification, such as that of FIG. 4, after a sink pin of any IPD path is located, a fan in is performed from said sink pin to determine branches therefrom. Any elements on these branches not already marked as IPD logic are marked as IPD side logic. A similar fan out is performed from the source pin of any IPD path. This would, for instance, mark the elements between junction 377 and the clock pin of flip-flop 357 during a fan out from clock source 361, which is the source of IPD path 341 (and others). If IPD side logic is later also identified as IPD logic, the latter identification overrides the former identification. IPD side logic is preferably disabled in, but not removed from, the reduced netlist, and may be enabled in response to an ECO change to a corresponding IPD path.

It is noted that, although more convenient when applied to circuit blocks of a circuit design, any of the systems and methods described herein may be adapted to analyze a complete circuit design.

6. Results

The above methodologies were tested on a circuit design containing 59 million logical elements and three power domains. The results are shown in Table 1, below:

TABLE 1

|  | Standard Method | Disclosed Method | Improvement |
| --- | --- | --- | --- |
| Logical Elements Analyzed | 59 million | 7 million | 8.4X |
| Runtime | 205 minutes | 66 minutes | 3.1X |
| Memory Usage | 77 GB | 46 GB | 1.7X |

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A method for multi-domain timing analysis of a circuit design for an electronic circuit, the circuit design having a plurality of interconnected cells and a plurality of power domains therefor, the power domains establishing respective non-ground voltages provided by different power supplies, the method comprising:
 establishing a netlist defining the cells of the circuit design, a plurality of timing paths each being defined to traverse at least one of the cells of the circuit design;
 executing a processor to selectively determine at least one of the timing paths to be an inter-power domain (IPD) timing path according to predetermined IPD criteria, the IPD criteria including traversal by a timing path through at least one multi-supply element, each multi-supply element including one or more cells energized by multiple power domains; and,
 executing a processor to selectively actuate at least one multi-domain timing analysis based on an IPD netlist collectively designating each said IPD timing path,
 wherein the circuit design is altered to correct at least one timing violation detected by the multi-domain timing analysis, and
 wherein the electronic circuit is manufactured based on the altered circuit design.

2. The method of claim 1, further comprising designating each cell traversed by at least one IPD timing path as an IPD element within the netlist to generate the IPD netlist.

3. The method of claim 1, further comprising:
 designating each cell traversed by at least one IPD timing path as an IPD element; and
 removing from the netlist each cell not designated as an IPD element to generate the IPD netlist.

4. The method of claim 1, further comprising selectively enabling each said IPD timing path for the multi-domain timing analysis in the netlist to generate the IPD netlist.

5. The method of claim 1, wherein said predetermined IPD criteria further include a timing path being a capture clock path for a second timing path traversing through at least one multi-supply element, at least one timing path not traversing a multi-supply element thereby determined to be an IPD timing path.

6. The method of claim 1, further comprising:
 traversing a sequence of stages in a direction of signal propagation from at least one multi-supply element to a timing path sink, the timing path sink being one of a flip-flop data pin or an output port; and,
 traversing a sequence of stages against the direction of signal propagation from the multi-supply element to a timing path source, the timing path source being one of a clock source or an input port,
 wherein at least one IPD timing path includes a timing path defined between said timing path source and said timing path sink.

7. The method of claim 6, wherein:
 the traversal of the sequence of stages in a direction of signal propagation includes designating a cell of each traversed stage as an IPD element in the netlist, and, the traversal of the sequence of cells counter to a direction of signal propagation includes designating a cell of each traversed stage as an IPD element in the netlist.

8. The method of claim 6, further comprising:
 traversing a sequence of stages in a direction of signal propagation from the timing path source to a side path sink, the side path sink being one of a flip-flop data pin or an output port, and designating a cell of each traversed stage not previously designated as an IPD element in the netlist as an IPD side element;
 traversing a sequence of stages counter to a direction of signal propagation from the timing path sink to a side path source, the side path source being one of a clock source or an input port, and designating a cell of each traversed stage not previously designated as an IPD element in the netlist as an IPD side element;
 removing from the netlist each cell not designated as an IPD element or an IPD side element to generate the IPD netlist; and,
 selectively enabling each designated IPD element in the IPD netlist for the multi-domain timing analysis.

9. A method for multi-domain timing analysis of a circuit design for an electronic circuit, the circuit design having a plurality of interconnected cells and a plurality of power domains therefor, the power domains establishing respective non-ground voltages provided by different power supplies, the method comprising:
 establishing a netlist defining the cells of the circuit design, a plurality of timing paths each being defined to traverse at least one of the cells of the circuit design;
 executing a processor to selectively determine at least one of the timing paths to be an inter-power domain (IPD) timing path according to predetermined IPD criteria, the IPD criteria including traversal by a timing path through at least one multi-supply element, each multi-supply element including one or more cells energized by multiple power domains, the determination including:
  traversing a sequence of stages in a direction of signal propagation from at least one multi-supply element to a timing path sink, the timing path sink being one of a flip-flop data pin or an output port,
  traversing a sequence of stages against the direction of signal propagation from the multi-supply element to a timing path source, the timing path source being one of a clock source or an input port, wherein at least one IPD timing path includes a timing path defined between said timing path source and said timing path sink,
  traversing a sequence of stages in a direction of signal propagation from the timing path source to a side path sink, the side path sink being one of a flip-flop data pin or an output port, and designating a cell of each traversed stage not previously designated as an IPD element in the netlist as an IPD side element,
  traversing a sequence of stages counter to a direction of signal propagation from the timing path sink to a side path source, the side path source being one of a clock source or an input port, and designating a cell of each traversed stage not previously designated as an IPD element in the netlist as an IPD side element,
  removing from the netlist each cell not designated as an IPD element or an IPD side element to generate a pruned IPD netlist, and,
  selectively enabling each designated IPD element in the pruned IPD netlist for the multi-domain timing analysis; and, executing a processor to selectively actuate at least one multi-domain timing analysis based on each said IPD timing path, wherein the circuit design is altered to correct at least one timing violation detected by the multi-domain timing analysis, and wherein the electronic circuit is manufactured based on the altered circuit design.

10. The method of claim 9, further comprising designating each cell traversed by at least one IPD timing path as an IPD element within the netlist.

11. The method of claim 10, wherein the netlist pruning includes removing from the netlist each cell not designated as an IPD element from the netlist to generate a pruned IPD netlist.

12. The method of claim 9, wherein:
the traversal of the sequence of stages in a direction of signal propagation includes designating a cell of each traversed stage as an IPD element in the netlist, and,
the traversal of the sequence of cells counter to a direction of signal propagation includes designating a cell of each traversed stage as an IPD element in the netlist.

13. A system for multi-domain timing analysis of a circuit design for an electronic circuit, the circuit design having a plurality of interconnected cells and a plurality of power domains therefor, the power domains establishing respective non-ground voltages provided by different power supplies, the system comprising:
a netlist generator executable to establish a netlist defining the cells of the circuit design, a plurality of timing paths each defined to traverse at least one of cells of the circuit design;
an inter-power domain (IPD) configurator executable to selectively determine at least one of the timing paths to be an inter-power domain (IPD) timing path according to predetermined IPD criteria, the IPD criteria including traversal by a timing path through at least one multi-supply element, each multi-supply element including one or more cells energized by multiple power domains; and
a timing analyzer executable to selectively actuate at least one multi-domain timing analysis based on an IPD netlist collectively designating each said IPD timing path,
wherein the circuit design is altered to correct at least one timing violation detected by the multi-domain timing analysis, and
wherein the electronic circuit is manufactured based on the altered circuit design.

14. The system of claim 13, wherein the IPD configurator is further executable to designate each cell traversed by at least one IPD timing path as an IPD element within the netlist to generate the IPD netlist.

15. The system of claim 13, wherein the IPD configurator is further executable to:

designate each cell traversed by at least one IPD timing path as an IPD element, and
remove from the netlist each cell not designated as an IPD element to generate the IPD netlist.

16. The system of claim 13, wherein the IPD configurator is further executable to:
traverse a sequence of stages in a direction of signal propagation from at least one multi-supply element to a timing path sink, the timing path sink being one of a flip-flop data pin or an output port; and,
traverse a sequence of stages against the direction of signal propagation from the multi-supply element to a timing path source, the timing path source being one of a clock source or an input port,
wherein at least one IPD timing path includes a timing path defined between said timing path source and said timing path sink.

17. The system of claim 16, wherein:
the traversal of the sequence of stages in a direction of signal propagation includes designating a cell of each traversed stage as an IPD element in the netlist, and,
the traversal of the sequence of cells counter to a direction of signal propagation includes designating a cell of each traversed stage as an IPD element in the netlist.

18. The system of claim 16, wherein the IPD configurator is further executable to:
traverse a sequence of stages in a direction of signal propagation from the timing path source to a side path sink, the side path sink being one of a flip-flop data pin or an output port, and designating a cell of each traversed stage not previously designated as an IPD element in the netlist as an IPD side element;
traverse a sequence of stages counter to a direction of signal propagation from the timing path sink to a side path source, the side path source being one of a clock source or an input port, and designating a cell of each traversed stage not previously designated as an IPD element in the netlist as an IPD side element;
remove from the netlist each cell not designated as an IPD element or an IPD side element to generate the IPD netlist; and,
selectively enable each designated IPD element in the IPD netlist for the multi-domain timing analysis.

19. The system of claim 13, wherein said predetermined IPD criteria further include a timing path being a capture clock path for a second timing path traversing through at least one multi-supply element, at least one timing path not traversing a multi-supply element thereby determined to be an IPD timing path.

20. The system of claim 13, wherein the IPD configurator is further executable to selectively enable each said IPD timing path for the multi-domain timing analysis in the netlist to generate the IPD netlist.

* * * * *